United States Patent [19]

Gaines, Jr. et al.

[11] 3,961,122

[45] *June 1, 1976

[54] THIN POLYMER FILMS AND METHOD

[75] Inventors: George L. Gaines, Jr., Scotia; Donald G. LeGrand, Burnt Hills, both of N.Y.

[73] Assignee: General Electric Company, Schenectady, N.Y.

[ * ] Notice: The portion of the term of this patent subsequent to Aug. 22, 1989, has been disclaimed.

[22] Filed: Feb. 24, 1975

[21] Appl. No.: 552,554

Related U.S. Application Data

[60] Continuation of Ser. No. 298,471, Oct. 18, 1972, abandoned, which is a division of Ser. No. 164,847, July 26, 1971, abandoned, which is a continuation of Ser. No. 839,272, July 7, 1969, abandoned.

[52] U.S. Cl. ............................ 428/220; 260/824 R; 260/827
[51] Int. Cl.² .................. B32B 25/20; C08F 293/00
[58] Field of Search ............. 260/824, 827; 428/220

[56] References Cited
UNITED STATES PATENTS

| | | | |
|---|---|---|---|
| 3,342,766 | 7/1967 | Huntington | 260/827 |
| 3,686,355 | 8/1972 | Gaines et al. | 260/824 R |

*Primary Examiner*—Wilbert J. Briggs, Sr.
*Attorney, Agent, or Firm*—Jane M. Binkowski; Joseph T. Cohen; Jerome C. Squillaro

[57] ABSTRACT

A method for making thin, substantially uniform and self-supporting polymer films by forming a solution of a base polymer, a surface-active block copolymer and a solvent, and forming a film from said solution by contacting it with film-forming means. The block copolymer contains at least two polymerized comonomers, one of which is compatible or substantially miscible with the base polymer and serves to distribute the block copolymer therein and the second of which is sufficiently surface-active in the resulting polymer solution to produce a solution having a surface tension sufficiently low to allow the formation of useful films less than 50 microns in thickness.

6 Claims, 5 Drawing Figures

THIN POLYMER FILMS AND METHOD

This is a continuation of copending application Ser. No. 298,471, filed Oct. 18, 1972, now abandoned, which is a Division of the then copending application Ser. No. 164,847, filed July 26, 1971, now abandoned, which is a continuation of the then copending application Ser. No. 839,272, filed July 7, 1969, now abandoned.

This invention relates to the art of making very thin polymer films. Specifically, it relates to novel substantially uniform films less than 50 microns in thickness, and generally, less than about 20 microns in thickness, and also relates to a new method of making these films.

The most common techniques for forming polymer films are melt extrusion, calendering and solvent casting. Melt extrusion of a polymer requires that it be thermally stable and have a suitable rate of flow. Prior to melt extrusion, the polymer is usually modified with one or more additives such as a lubricant to prevent sticking to the inner surfaces of the extruder, a plasticizer to increase rate of flow and a heat stabilizer. In addition to the rather complex equipment required by a melt extrusion process, it is not useful for preparing thin films without extensive orientation of the films. Calendering, on the other hand, is not satisfactory for preparing films having a thickness less than two mils.

Solution casting involves forming a solution of the polymer and casting it onto a substrate to produce a thin coating which is then dried and recovered as a film. Very thin, continuous films of a number of polymers cannot be prepared by this method due to their high surface tension resulting in a lack of wettability of a substrate surface, making it difficult to produce substantially smooth-surfaced films having a thickness less than 50 microns. In addition, adhesion of the thin coating to a particular substrate surface would inhibit separation.

It is an object of the present invention to overcome the disadvantages of the prior art and produce thinner, self-supporting stable films than has heretofore been possible. Thus, in pursuit of this goal we discovered that a suitably surface-active block copolymer dissolved in a solvent along with a base polymer can produce a novel solution having surface tension sufficiently low to form stble films less than 50 microns in thickness, and preferably, less than about 20 microns in thickness.

The present invention, together with further objects and advantages thereof, will be better understood from the following description taken in connection with the accompanying drawings, in which.

Figure 4:
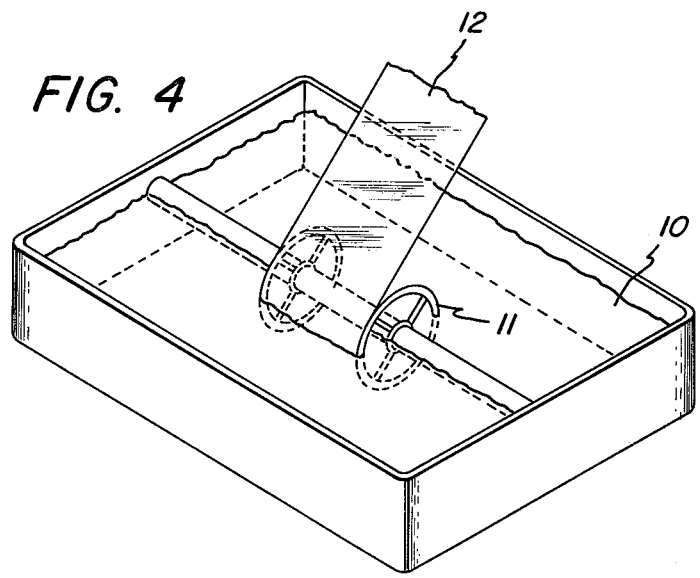
Figure 5:
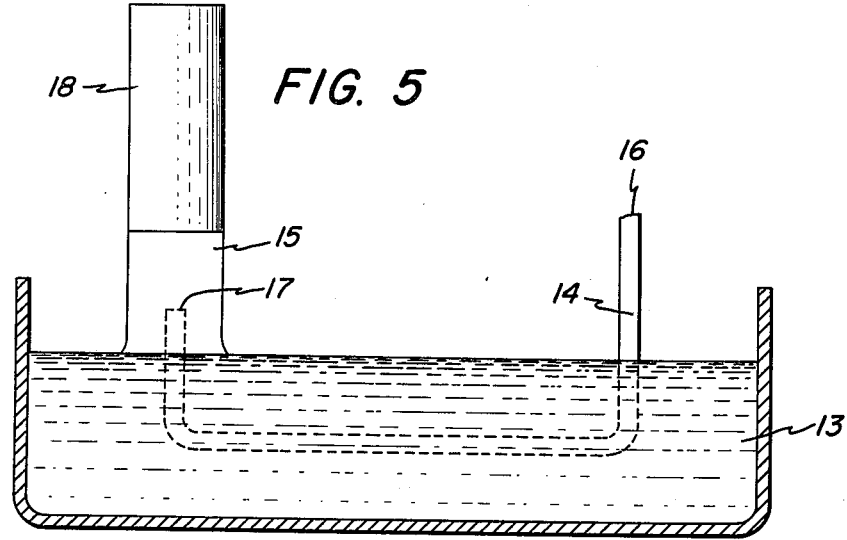

FIG. 4 is a cross-section of a film-forming structure which is an open cylindrical framework partially immersed in a film-forming solution and showing the formation of polymer film thereon; and FIG. 5 is a cross-sectional view of a film-forming assembly showing the formation of tubular film from the present solution by means of a tube being drawn perpendicularly from the solution having the polymer film appended to it into which gas is being introduced to prevent the film from collapsing.

Briefly stated, the process of the present invention comprises forming a solution of a base polymer, a surface-active block copolymer and a solvent, and forming a film from said solution by contacting it with film-forming means. The block copolymer additive contains at least two polymerized comonomers. One of the polymerized comonomer components is compatible with or substantially miscible in the base polymer and serves to distribute the block copolymer in the polymer solution. The second polymerized comonomer component is sufficiently surface-active in the resulting polymer solution to produce a solution having a surface tension sufficiently low to allow the formation of a stable film. In addition, the solution must have a viscosity which produces a continuous film less than 50 microns in thickness. The film may be as thin as desired.

The base polymer herein is a solid and one which, when dissolved alone in a solvent, produces a solution from which substantially uniform films less than 50 microns in thickness cannot be formed. However, with a proper block copolymer, it can form such thin, self-supporting films according to the present invention. As used herein, by the term base polymer it is meant a polymer which may be a homopolymer, a copolymer or even a miscible mixture of polymers.

As used herein, the term "surface-active block copolymer," means one which when dissolved in a solvent along with the base polymer produces a solution having a surface tension sufficiently low to allow the formation of thin, stable, substantially uniform self-supporting films less than 50 microns in thickness. The surface tension of the solution can vary and depends on the particular block copolymer and base polymer used and the amounts in which they are used as well as the solvent used. The surface-active block copolymer acts to depress the surface tension of the resulting polymer solution.

The block copolymer contains at least two polymerized comonomers. One of the polymerized comonomer components, because it itself is substantially compatible or miscible with the base polymer, tends to make the block copolymer compatible with the base polymer and facilitates distribution of the block copolymer in the polymer solution. By "compatible" it is meant substantially stable therein or substantially miscible therein. An example of such a compatibility-imparting polymerized comonomer is styrene for a base polymer such as polystyrene and polyphenylene oxide. The second polymerized comonomer component is sufficiently surface-active in the resulting polymer solution to produce a solution having a surface tension sufficiently low to allow the formation of a stable film less than 50 microns in thickness. Typical examples of such surface-activity-imparting comonomers are organosiloxanes such as dimethylsiloxane, and fluoro-containing monomers such as pentadecafluoro-octyl methacrylate and 2-(N-propylperfluoro-octane sulfonamido) ethyl acrylate.

The block copolymer used in the present invention can vary in composition and structure. It may be a graft branched, or linear block copolymer. Since it is a block copolymer, it contains repeating segments or blocks of the same monomeric unit and these blocks have a length close to the average block length for that particular monomer. However, the average block length of one comonomer component can differ from the average block length of a second comonomer component and such differing average block lengths largely determine the properties of the resulting block copolymer.

An example of a linear block copolymer of A and B monomeric units may have the following structure:

...AAAAABBBAAAABBBBAAAAAABB...

where the A block has an average of 5 units and the B block averages 3 units. An example of a graft block copolymer of A and B monomeric units may have the following structure:

```
...AAAAAAA...    ...AAAAAA
      B              B
      B              B
      B              B
      B              B
```

As is well known in the art, the block copolymer is distinguishable from random copolymers which do not contain substantially uniform blocks, e.g. copolymers which on the average contain no particular repeating sequence of the same monomeric units and which may have combinations of units varying widely in length and dispersion (e.g., ABAAAABABBAABBBABAB...).

Random copolymers, therefore, are not useful in the present invention since, as a practical matter, they cannot be prepared to have the predetermined properties of the present block copolymers.

The block copolymer of the present invention can be prepared by a number of conventional techniques. It should be prepared, however, so that it will have the desired compatibility and surface-activity in a particular polymer solution. The molecular weight of the block copolymer may vary widely but it should be sufficiently high so that it is substantially non-volatile in the preparation of the present composition and its use. For most applications, the polymerized comonomer component of the block copolymer additive which tends to make the additive compatible with a particular polymer should have an average block length of at least three monomer units, and the polymerized comonomer component of the additive which provides the desired surface-activity should have an average block length of at least five monomer units. The maximum average block length of each comonomer component can only be determined empirically, i.e. it depends largely on the amount of block copolymer used with a particular base polymer and solvent.

The amount of the block copolymer used may be determined empirically and would depend largely on its composition and the decrease in surface tension it effects in the resulting polymer solution. For the formation of most thin films in the instant process, the amount of the block copolymer additive ranges from about 0.1 to about 2 percent by weight of the base polymer. However, depending on the specific properties of the block copolymer used, the block copolymer may be used in an amount from 0.0001 to 99 percent by weight of the base polymer.

The requirement of the block copolymer in forming the films of the present invention is illustrated, for example, with a polycarbonate as the base polymer. Addition of a surface-active material, such as polydimethylsiloxane resin, to a solution of the polycarbonate may lower the surface tension of the solution but this solution would be incapable of forming useful, thin films due to the incompatibility of the two materials. However, in accordance with the present invention, thin, self-supporting films of the polycarbonate can be produced by substantially dissolving in the polycarbonate solution a polycarbonatepolydimethylsiloxane block copolymer in proper amount so that the polycarbonate blocks serve to distribute the additive in the polycarbonate solution and the accompanying surface-active polydimethylsiloxane blocks decrease the surface tension of the solution and stabilize the film during its formation.

A number of solvents are useful in the present invention. The particular solvent used may be an aqueous solvent or an organic solvent and depends largely on the base polymer and the surface-active block copolymer used. Any solvent which does not react with the base polymer or the block copolymer and in which these polymers are soluble can be employed. The amount of solvent used depends upon the solution viscosity desired. A specific example of an organic-solvent-polymer system of the present invention is methylene chloride for a polycarbonate base polymerpolycarbonate-polydimethylsiloxane block copolymer system. A specific example of an aqueous solvent-polymer system is water for a polyethylene oxide base polymer-polyethylene oxide-polydimethylsiloxane block copolymer system.

The total amount of base polymer and surface-active block copolymer must impart to the resulting polymer solution a viscosity sufficient to produce a continuous film less than 50 microns in thickness. The viscosity of the present solution largely determines the thickness of the resulting film, and the more viscous a particular solution is, the thicker is the resulting film.

Figure 1:
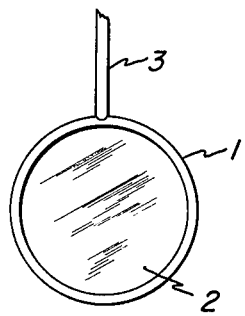
FIG. 1 shows a film-forming structure which is a wire in the form of a ring carrying a polymer film of this invention.
Figure 2:
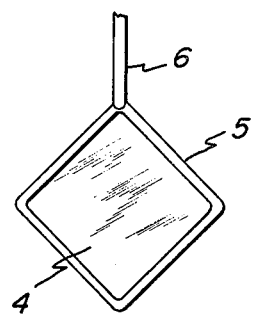
FIG. 2, shows a film-forming structure which is a wire in the form of a square carrying another polymer film of this invention.
Figure 3:
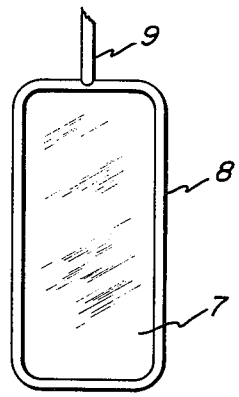
FIG. 3, shows a film-forming structure which is a wire in the form of a rectangle carrying still another polymer film of this invention.

The film-forming means used in the present invention can take a number of forms with the preferred forms being frames as shown in the accompanying figures. Thus the film-forming structure of FIG. 1 is a metal wire 1 in the form of a ring carrying polymer film 2 and having a handle 3. In FIG. 2 the film-forming structure is a metal wire 5 in the form of a square carrying polymer film 4 and having a handle 6. The film-forming structure of FIG. 3 is a metal wire 8 in the form of a rectangle carrying polymer film 7 and handle 9. The structures of FIGS. 1, 2 and 3 may be contacted with the polymer solution in a number of ways. For example they may be passed through the present polymer solution or dipped into it.

The FIG. 4 film-forming structure is an open cylindrical framework 11 which is rotated in the present solution 10 to pick up a polymer film 12.

The rate at which these film-forming structures are removed from the polymer solution can vary but it should be such that the films are adequately supported by adherence to the film-forming structure.

FIG. 5 shows the formation of tubular film 15 by placing tube 18 perpendicular to the solution, tube 18 being closed at its upper end and opened at its lower end, dipping the open end of the tube into the present solution 13 and removing the tube to allow tubular film 15 to adhere to the perimeter of its open end. A gas is introduced into opening 16 of tube 14 which passes into tubular film 15 at exit 17 to prevent the film from collapsing.

The surface tension of the present polymer solution is such that it will allow the formation of a thin stable film having a thickness less than 50 microns, and preferably, less than about 20 microns. A solution with such a surface tension also has good wettability and when using substrates such as the frames illustrated in FIGS. 1 through 5, should wet a substrate so that the resulting adherence is adequate to support the film as shown in the drawings. However, certain materials such as polyethylene and polytetrafluoroethylene have low surface energies and are harder to wet than more polar materials such as glass or metals. Polar materials are therefore preferred as substrates in the practice of the process of the present invention. An indication of the surface energy of a solid can be obtained by measuring the contact angle of a liquid formed thereon.

If not oriented during the film-forming stage, the films of the present invention can be oriented, if desired to obtain enhanced properties by suitable manipulation of the film.

If desired, films of a number of polymers formed by the present invention can be cross-linked to improve certain of their properties.

The cross-linking, or curing, can be carried out in a conventional manner such as by subjecting the film to ionizing radiation. Any conventional source of ionizing radiation can be used. The various types of ionizing radiation and apparatus suitable for supplying the high energy electrons, is more particularly described in Lawton et al. U.S. Pat. No. 2,997,418, issued Aug. 22, 1961, and assigned to the same assignee as the present invention.

It is also possible to cure a number of the films of the present invention by including a source of free radicals in the solution, and curing the resulting film such as by heating it. A number of conventional curing agents can be used and representative of these agents are organic peroxides such as di-($\alpha$-cumyl) peroxide [or bis($\alpha,\alpha$-dimethylbenzyl) peroxide as it is also known].

The process of the present invention can be used to produce novel thin films having a wide variety of properties for a number of applications. For example, they are useful as membranes for separating gases. Such separation is effected because certain gases will permeate through the polymer film at a faster rate than other gas components of a gas mixture. The films are particularly useful as a dielectric for capacitors since the thinner the dielectric, the higher is the capacitance.

The films formed are also useful in the biomedical area where polymer films for implanted protheses are often limited in application because of their thickness or by their surface properties which lead to tissue incompatibility, thrombus formation, etc.

All parts and percentages used herein are by weight unless otherwise noted.

The invention is further illustrated by the following examples.

In the following examples, the tests and materials used were as follows:

Surface tension was measured with a duNöuy tensiometer ring.

The polycarbonate used is sold under the trademark Lexan and is a polycarbonate of 2,2-bis(4-hydroxyphenyl) propane (Bisphenol A).

The polycarbonate-polydimethylsiloxane block copolmer was prepared substantially as set forth in U.S. Pat. No. 3,189,662. The polycarbonate was the intercondensation product of 2,2-bis(4-hydroxyphenyl) propane and phosgene.

The polystyrene-polydimethylsiloxane block copolymer was prepared substantially as set forth in French Patent Number 1,526,205, and assigned to the same assignee as the present invention.

The polydimethylsiloxane used was a silicone gum (SE 76) having a bulk viscosity of $\eta = 2 \times 10^5$ poises.

Film thicknesses were measured with a Federal micrometer.

The particular composition and average block length of the block copolymer was determined by the method of preparation and by nuclear magnetic resonance spectroscopy.

EXAMPLE

In this example the film-forming structure was a metal ring having a 1½ inch diameter and provided with a handle as illustrated in FIG. 1.

A solution was prepared by dissolving 20 grams of polycarbonate in 100 cc of methylene chloride at room temperature. The ring was immersed in the solution and removed at a rate slow enough to allow sufficient adherence of the solution to its perimeter to support a thin continuous film formed within the ring. The film-carrying ring was then held in air at room temperature to allow the solvent to evaporate. The film was usually dry in about 2 minutes. The results are shown in the following table.

This same film-forming procedure was carried out in all the runs tabulated in the following table. In each of the runs, 100 cc of methylene chloride at room temperature was used as the solvent for forming the polymer solution of the table.

In the following table, the block length units are monomer units.

| Run | Polymer Solution Polymer | Grams | Number Avg. Mol. Wt. $M_n$(Osmotic) | Surface Tension of Solution dynes/cm. | Polymer Film Properties |
| --- | --- | --- | --- | --- | --- |
| A | Polycarbonate | 20 | 90,000 | 28 | Film was non-uniform in thickness and ranged from about 2 to 5 mils (50 to 125 microns). |
| B | Polycarbonate | 10 | 90,000 | 27.5 | Film break shortly after being formed on ring due to solvent evaporation. |
| C | Polycarbonate <br> 1)Polycarbonate - polydimethylsiloxane block copolymer | 10 <br> 1.5 | 90,000 <br> 44,000 | 23.7 | Film was continuous, optically clear and stable. It had smooth surfaces was substantially uniform in thickness which was 2 to 10 microns. Film appears to retain original properties after one month in air at room temperature. |
| D | Polycarbonate <br> 1)Polycarbonate - polydimethylsiloxane block copolymer | 10 <br> 1.0 | 90,000 <br> 44,000 | 24.4 | Same as C. |
| E | Polycarbonate | 10 | 90,000 | 24.1 | Same as C except film 10 to 15 |

| Run | Polymer Solution — Polymer | Grams | Number Avg. Mol. Wt. $M_n$(Osmotic) | Surface Tension of Solution dynes/cm. | Polymer Film Properties |
|---|---|---|---|---|---|
|   | [1]Polycarbonate - polydimethylsiloxane block copolymer | 0.8 | 44,000 |   | microns in thickness. |
| F | Polycarbonate [2]Polycarbonate-polydimethyl- siloxane block copolymer | 10 1.5 | 90,000 53,000 | 24 | Continuous, optically clear, stable film formed on ring. It had smooth surfaces and was substantially uniform with a thickness of 12 microns. |
| G | Polycarbonate [3]Polycarbonate-polydimethyl- siloxane block copolymer | 10 1.0 | 90,000 47,000 | 24.5 | Same as F except thickness was 5 to 10 microns. |
| H | Polystyrene | 20 | 63,500 | 27. | Film had irregular surfaces which exhibited bumps and flow lines giving it a corrugated effect. The film averaged about 3 mils (75 microns) in thickness. |
| I | Polystyrene [4]Polystyrene-polydimethyl- siloxane block copolymer | 15 0.8 | 63,500 83,500 | 24.7 | Continuous, smooth surfaced, stable film formed on ring. It was substantially uniform with a thickness of 5 to 10 microns. |
| J | Polycarbonate Polydimethylsiloxane | 10 1.5 | 90,000 | — | Solution can only be as a single phase (a milky suspension) by vigorous agitation-otherwise it separates in two layers. Film formed (with agitation of solution) was opaque, irregular, and 20 to 40 microns in thickness. It exhibited phase separation bleeding and had sticky surfaces. |

[1]50% by wt. polycarbonate (avg. block length 6 monomer units)-50% by wt. polydimethylsiloxane (avg. block length 20 monomer units).
[2]75% by wt. polycarbonate(avg. block length 18.5 monomer units)-25% by wt. polydimethylsiloxane (avg. block length 20 monomer units)
[3]35% by wt. polycarbonate(avg. block length 3.5 monomer units)-65% by wt. polydimethylsiloxane (avg. block length 20 monomer units)
[4]41% by wt. polystyrene(avg. block length 200 monomer units)-59% by wt. polydimethylsiloxane (avg. block length 400 monomer units).

In the above table, Runs A and B show that an organic solution of polycarbonate alone is incapable of forming a film substantially uniform in thickness less than 50 microns in thickness. Runs C through G illustrate the present invention in their formation of stable, substantially uniform, thin films. Specifically, Runs C, D and E show the results obtained with varying amounts of the same block copolymer, and Runs F and G show the use of block copolymers of different composition.

Run H shows that the thin film of the present invention cannot be produced with an organic solution of polystyrene alone but, as illustrated by Run I, the film can be obtained by the inclusion of the proper block copolymer.

Run J, which was a mixture of polycarbonate and polydimethylsiloxane, illustrates that the useful, thin, substantially uniform films of the present invention cannot be obtained without the block copolymer additive.

In copending U.S. patent application Ser. No. 839568, filed on the same day as the present patent application by George L. Gaines, Jr. and Donald G. LeGrand, and assigned to the same assignee as the present invention, there is disclosed a process for preparing thin films less than 50 microns in thickness from a solution of a surface-active polymer.

What is claimed is:

1. A continuous, stable, substantially uniform, self-supporting polymer film having smooth surfaces and a thickness of less than 50 microns, said film consisting essentially of a synthetic aromatic base homopolymer and a synthetic surface-active block copolymer additive compatible therewith, said additive ranging in amount from 0.1 to 99% by weight of said base homopolymer, said additive consisting essentially of substantially uniform repeating blocks of a first polymerized aromatic comonomer and a second polymerized organosiloxane comonomer, said first polymerized aromatic comonomer being characterized by an average block length of at least three monomer units and being compatible and substantially miscible with said base homopolymer to substantially stabilize said block copolymer therein, said second polymerized comonomer being characterized by an average block length of at least five monomer units and a surface activity sufficient to depress the surface tension of a solution of said base homopolymer to at least about 24.7 dynes/cm. or lower, said polymer film being produced by dissolving said aromatic base homopolymer and said block copolymer additive in a solvent to form a solution having a surface tension of about 24.7 dynes/cm. or lower, contacting the resulting solution with film-forming means which supports said solution to allow said solvent to evaporate without impairing the smooth surfaces of the resulting film, allowing said solvent to evaporate and recovering the resulting film.

2. A continuous film according to claim 1 wherein said base homopolymer is polyphenylene oxide.

3. A continuous film according to claim 1 wherein said base homopolymer is a polycarbonate.

4. A continuous film according to claim 1 wherein said base homopolymer is polystyrene.

5. A continuous, stable, substantially uniform, self-supporting polymer film having smooth surfaces and a thickness of less than 50 microns, said film consisting essentially of an organic base homopolymer and a substantially compatible synthetic surface-active block copolymer, said block copolymer consisting essentially of substantially uniform repeating blocks of a first polymerized organic comonomer and a second polymerized organosiloxane comonomer, said first polymerized comonomer being characterized by an average block length of at least three monomer units and being compatible with said base homopolymer to distribute and stabilize said block copolymer therein, said organic base homopolymer and said first polymerized comonomer being formed from the same monomer, and said second polymerized comonomer being characterized by an average block length of at least five monomer units and a surface activity sufficient to depress the surface tension of a solution of said base homopolymer to at least about 24.7 dynes/cm. or lower, said block copolymer being present in an amount up to about 15 percent by weight of the base homopolymer, said polymer film being produced by dissolving said organic base homopolymer and said surface-active block copolymer in a solvent to form a solution having a surface tension of about 24.7 dynes/cm. or lower, contacting the resulting solution with film-forming means which supports said solution to allow said solvent to evaporate without impairing the smooth surfaces of the resulting film, allowing said solvent to evaporate and recovering the resulting film.

6. A self-supporting film according to claim 5 which is optically clear wherein said organic base homopolymer is a polycarbonate and said block copolymer is a polycarbonatepolydimethylsiloxane block copolymer.

* * * * *